United States Patent [19]

Lloyd

[11] Patent Number: 4,989,812
[45] Date of Patent: Feb. 5, 1991

[54] BODY WITH DEPLOYABLE SUPPORT MEANS

[75] Inventor: David H. Lloyd, Bristol, England

[73] Assignee: British Aerospace Public Limited Company, London, England

[21] Appl. No.: 397,687

[22] Filed: Aug. 23, 1989

[30] Foreign Application Priority Data

Sep. 9, 1988 [GB] United Kingdom ............... 8821217

[51] Int. Cl.⁵ .......................................... F16M 11/38
[52] U.S. Cl. ................................ 248/170; 248/188.7
[58] Field of Search ............... 248/170, 167, 168, 171, 248/436, 166, 188.6, 188.7

[56] References Cited

U.S. PATENT DOCUMENTS

| 1,436,441 | 11/1922 | Gaudreau et al. | 248/170 |
| 2,588,399 | 3/1952 | McQuin | 248/170 X |
| 3,235,215 | 2/1966 | Lodde, Jr. | 248/170 X |
| 4,010,922 | 3/1977 | Heller et al. | 248/170 X |
| 4,061,302 | 12/1977 | Boone | 248/170 |
| 4,223,860 | 9/1980 | Prest | 248/170 X |
| 4,695,022 | 9/1987 | Mendosa et al. | 248/170 X |
| 4,705,251 | 11/1987 | Samuelsson | 248/171 |

Primary Examiner—Ramon O. Ramirez
Attorney, Agent, or Firm—Cushman, Darby & Cushman

[57] ABSTRACT

Automatically deployable support means for a body requiring, in use, to stand in an upright position on a surface, for example a land surface or the sea bed has a plurality of legs pivoted to the body so as to be movable from a stowed position to a support position in which they extend generally outwards and downwards from the body, the deployment means for effecting such movement including an axially movable cam housed in the body and a cam follower formed on each leg.

5 Claims, 2 Drawing Sheets

BODY WITH DEPLOYABLE SUPPORT MEANS

This invention relates to support means for body units requiring to stand in an upright position on a surface, for example a land surface or the sea bed. The body without this support means would normally adopt an undesired orientation.

The invention is particularly but not exclusively suitable for units having an elongate body, and/or where the support means are automatically deployed.

SUMMARY OF THE INVENTION

According to the invention, a body which is intended, in use, to be positioned with a generally upright axis on a surface includes a plurality of legs, each leg having a pivot by which it is mounted upon the body for pivotal movement from a stowed position generally parallel to the body axis to a support position in which it extends generally outwardly and downwardly from the body axis has leg has a cam follower portion extending from the region of its pivot toward the body axis for engagement with an axially movable cam carried by the body for movement along the axis, thereby to effect pivotal movement of the legs, and actuation means to effect such axial movement.

Preferably the cam has at least two cam surface regions, one lying generally transverse to the direction of movement of the cam for effecting pivotal movement of the legs and one lying generally parallel to the direction of movement of the cam for holding the legs in the support position.

Positive locking of the legs in the support position may be effected by causing the cam to hold the cam followers against shoulder regions formed on the body.

Preferably the legs are arranged such that the cam followers protrude generally radially toward the body axis. In this case, the cam may conveniently be formed as a piston-like member with a crown region and a skirt region, these regions respectively forming said two cam surface regions.

BRIEF DESCRIPTION OF THE DRAWINGS

One embodiment of support means according to the invention is illustrated by way of example in the accompanying drawings in which.

DETAILED DESCRIPTION OF THE PREFERRED EMBODIMENT

Figure 1:
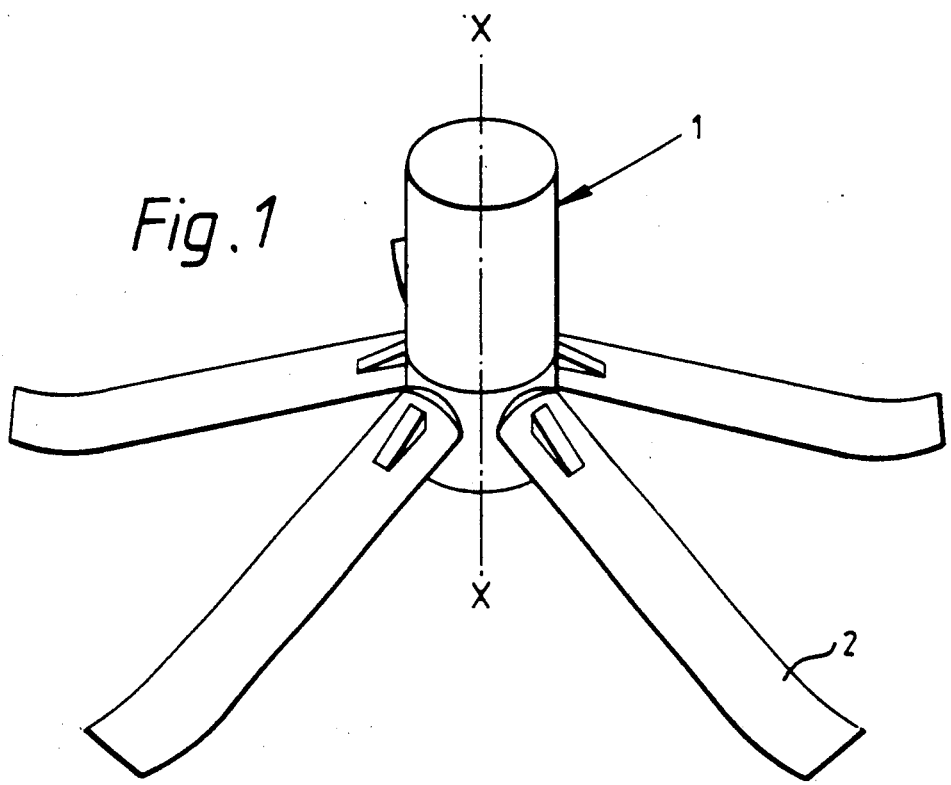
FIG. 1 is a perspective view of a unit with its legs in a deployed state.
Figure 2:
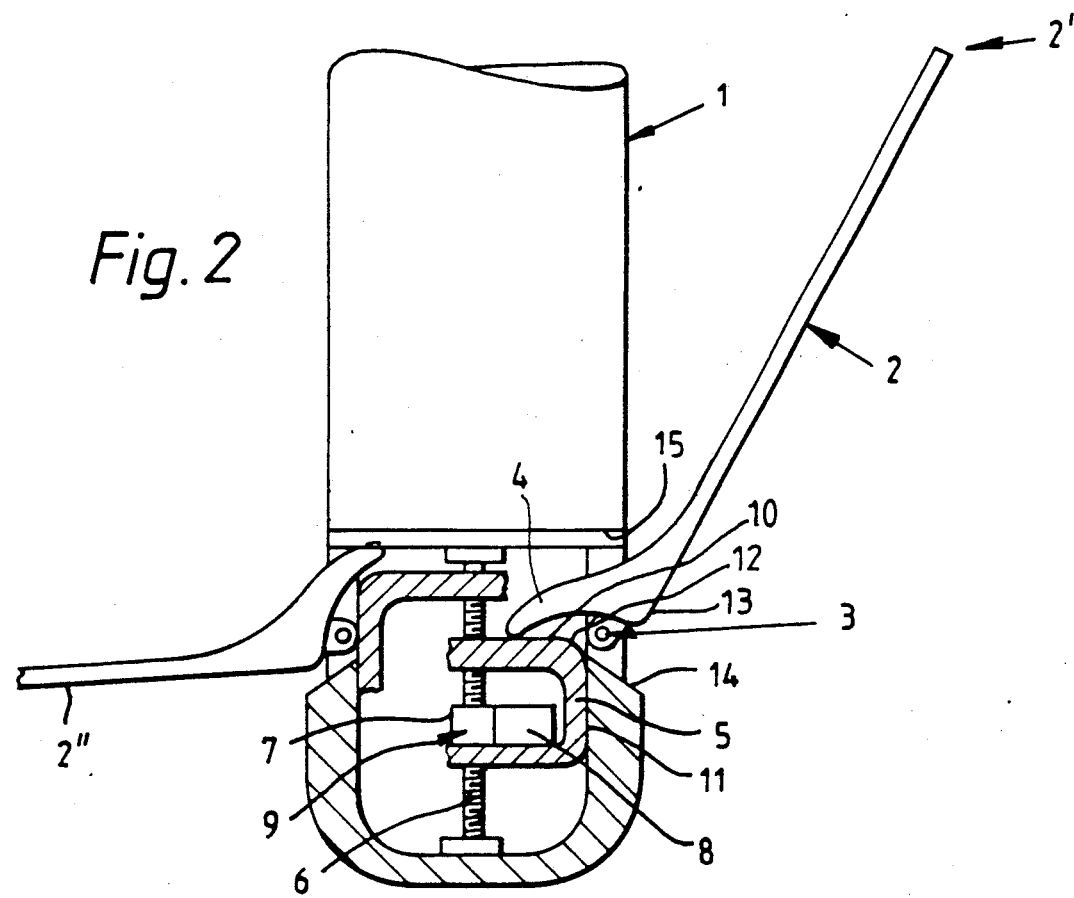
FIG. 2 shows two part-sectional views of the unit of FIG. 1 the sections being taken upon the axis of the body, and the legs being shown in two partially deployed states by way of information.

Referring to FIG. 1 a unit to be supported in an upright position on a surface comprises a body 1 having an axis X—X. The body is of elongate circular cross-sectioned form and in use is required to be positioned with its axis in a generally upright position. This is effected by providing the unit with a plurality of legs 2 which are hinged to a lower portion of the body and which are deployable from a stowed position in which they lie adjacent the body to a deployed position in which they provide support. FIG. 2 illustrates the mounting and deployment arrangement.

Each leg 2 is of elongate form and each is pivoted by means of a pivot pin 3 to the body 1, the axis of each pin lying tangential to an imaginary circle centered upon the axis X—X.

Each leg is provided with a cam follower portion 4 which extends from the region of the pivot toward the axis X—X. Each cam follower contacts a common cam 5 which is piston-like and lies coaxially with the axis X—X and is movable axially along it. Such axial movement is effected by means of a lead screw 6 also lying coaxially with the axis X—X and fixed relatively to the body. A gear 7 contained within the gear system 9 acts like a rotating nut engaging the lead screw and is driven by an electric motor 8 which may be battery powered, via the gear system 9. Rotation of the nut causes it to climb up or down the fixed lead screw as required with the cam 5 moving likewise. Restraining means are provided to prevent cam rotation about axis x—x. Naturally, the motor, gear system and nut are all carried by the cam, and are conveniently housed within it.

The cam 5 as before stated, is piston shaped i.e. generally cylindrical. It may have a flat crown, forming a first cam surface 10, and a cylindrical skirt region, forming a second cam surface 11. A region of curvature 12 blends the two regions together.

In operation, as drawn, in that part-section to the right, the cam 5 lies at the end of its travel towards the bottom of the body. In this position, each leg is in a generally upright position lying against the elongate body. The cam follower 4 may be in contact with the cam surface 10 at this time. The legs can be positively held in the stowed position by means of releasable straps, not shown.

To effect deployment the cam 5 is moved upwards towards the position shown in that part-section to the left, its cam surface 10 thereby urging each cam follower 4 upwards and each leg to rotate about its pivot, through the intermediate positions 2' and 2" illustrated, to support positions in which the legs are directed radially outwardly and also downwardly. In this position, the cam followers 4 have moved from contact with the cam surface 10 to the cam surface 11 which ensures that the legs are splayed outwardly. The legs are held in the support position by either trapping the cam followers 4 between the cam surface 11 and a shoulder provided at say 15, or for causing the legs, at region 13 adjacent the pivots, to abut an outwardly sloping shoulder 14 formed on the body, or both.

This arrangement allows the mechanical advantage at various points of the deployment operation to be changed during design by varying the shape of the cam surfaces. Thus specific deployment situations can be catered for, for example where higher or lower forces need to be overcome as the legs are extended.

The multiple cam surface arrangement is particularly advantageous in that the system can be self locking, especially but not exclusively when used in conjunction with a shoulder formed upon the body. Thus the legs are readily held in the support position without complicated and additional locking mechanisms.

Yet a further advantage is that the cam is sufficiently large to house one or more items such as the gear system, the motor, and the battery, thereby providing an efficiently compact drive system.

There are possible alternatives and improvements to the design described above.

1. The base of the body housing the leg deployment mechanism can be provided with shock attenuating means to reduce any shock loads caused by the body hitting a surface.

2. The drive system could be replaced by gas or hydraulic powered devices.

3. A flap can be provided at the tip of each leg to provide a foot for digging into and ploughing soft surfaces to minimize slip and sinkage.

4. The cam 5, instead of being cylindrical, can be of polygonal or similar shape, each flat or near flat of the polygon providing a cam surface for a cam follower or followers. This would provide space for extra support material at the pivot regions.

5. The cam surfaces could be varied in shape so that the legs deploy in any chosen sequence or manner.

6. Any variations in the deployment angle of each leg could be accommodated by placing fluid adjusters in the cam/cam follower mechanism.

7. Each leg could be telescopic/sliding/extending.

I claim:

1. A body which is intended, in use, to be positioned with a generally upright axis on a surface includes a plurality of legs, each having a pivot by which it is mounted upon the body for pivotal movement from a stowed position generally parallel to the body axis to a support position in which it extends generally outwardly and downwardly form the body axis, each leg having a cam follower portion extending from the region of its pivot towards the body axis for engagement with an axially movable cam carried by the body for movement along the axis, thereby to effect pivotal movement of the legs, and actuation means to effect such axial movement.

2. A body according to claim 1 wherein the axially movable cam has at least two surface regions, one lying generally transverse to the direction of movement of the cam and one lying generally parallel to the direction of movement of the cam.

3. A body according to claim 1 or 2 wherein positive locking of the legs in the support position is effected by interaction of the cam follower portions with one of the cam alone and the cam and shoulder regions formed on the body.

4. A body according to claim 2 wherein the cam is formed as a piston-like member with a crown region and a skirt region respectively forming said two cam surface regions.

5. A body according to claim 3 wherein the cam is formed as a piston-like member with a crown region and a skirt region respectively forming said two cam surface regions.

* * * * *